J. S. MAXWELL.
VALVE.
APPLICATION FILED DEC. 17, 1914.
1,238,040.
Patented Aug. 21, 1917.
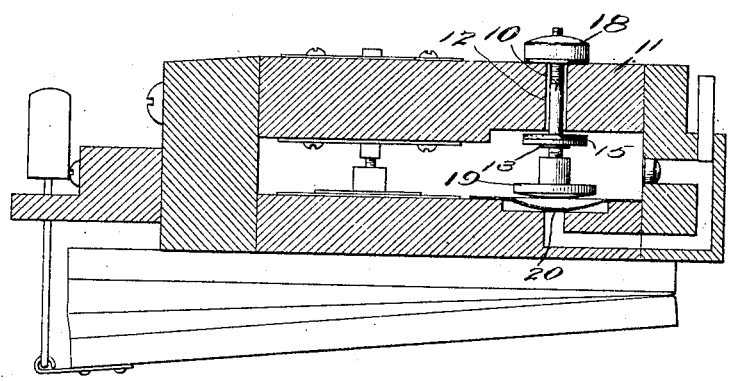
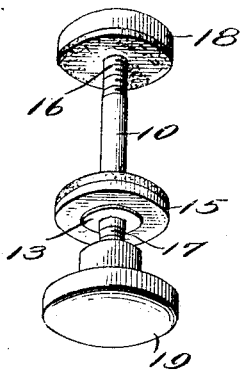 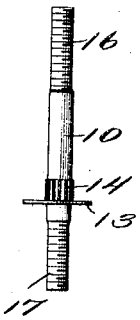 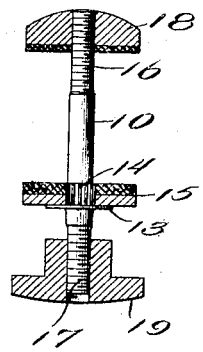
Witnesses
Inventor.
John S. Maxwell,
By Mason Fenwick Lawrence,
Attorneys

UNITED STATES PATENT OFFICE.

JOHN S. MAXWELL, OF RICHMOND, INDIANA, ASSIGNOR TO STARR PIANO COMPANY, OF RICHMOND, INDIANA, A CORPORATION OF INDIANA.

VALVE.

1,238,040.  Specification of Letters Patent.  Patented Aug. 21, 1917.

Application filed December 17, 1914. Serial No. 877,751.

*To all whom it may concern:*

Be it known that I, JOHN S. MAXWELL, a citizen of the United States, residing at Richmond, in the county of Wayne and State of Indiana, have invented certain new and useful Improvements in Valves; and I do hereby declare the following to be a full, clear, and exact description of the invention, such as will enable others skilled in the art to which it appertains to make and use the same.

This invention relates to valves and especially to primary valves for player pianos or like pneumatic instruments or mechanisms and has for an object to provide a valve with improved means for maintaining a single valve element rigidly and permanently intermediate the ends of the stem with adjustable members upon opposite ends of the stem.

A further object of the invention is to provide a valve stem having intermediate its ends a knurled hub and radially extending flange or collar adapted to interact to hold a valve member rigidly and non-rotatively in contact therewith, and provided upon opposite ends with screw threads upon which other members are adjustably positioned.

With these and other objects in view the invention comprises certain novel constructions, combinations and arrangements of parts as will be hereinafter more fully described and claimed.

In the drawings:

Figure 1 is a conventional showing of the pneumatic and associated parts with one of the improved valves associated therewith.

Fig. 2 is a perspective view of one of the improved valves assembled but removed from its mounting.

Fig. 3 is a sectional view through the several valve members showing the stem in side elevation.

Fig. 4 is a view in side elevation of the valve stem removed from its several members.

Like characters of reference designate corresponding parts throughout the several views.

The improved valve which forms the subject-matter of this application is adapted to be associated in any desired position and connection in a pneumatic instrument as for instance as shown at Fig. 1, but is especially adapted for use as a primary valve in a pneumatic player piano.

As shown at Fig. 1 the valve stem 10 is slidably mounted in the supporting bar 11, the opening 12 through which such stem is inserted being large enough to permit the passage of air as the valves are opened or closed.

The valve stem 10 is provided with a rigid or integral collar or flange 13 and immediately above such collar is a hub 14 milled longitudinally so that the valve member 15 may have its perforation slipped thereon until it bears rigidly against the flange 13 and by the milled hub 14 is maintained from rotation. By the combination of the flange 13 and the hub 14 the valve member 15 becomes rigidly and permanently secured upon the stem.

The valve stem 10 at its opposite ends is screw threaded as shown more particularly at 16 and 17 and upon one end as the end 16 a valve member 18 is adjustably mounted while a buffer 19 is likewise adjustably mounted on to the end 17 in position to be engaged by the pouch 20 in the usual manner of such actions.

It will be apparent, therefore, that both the buffer 19 and the valve member 18 are adjustable upon the stem 10, while the valve member 15 is rigid thereon; yet any of the three parts may be adjusted relative to the supporting bar 11 by adjusting either or both of the members 18 or 19, whereby the relative position of the member 15 to the bar will be changed. Said members 18 and 19 are adjusted by turning them on the threads of the stem, and meanwhile the latter may be held against rotation by grasping the member 15 which cannot rotate upon it.

Especial attention in this device is invited to the manner of fastening the valve member 15 to the stem whereby such valve member, not provided with screw threads as are the other two members, is nevertheless made permanent and rigid upon the stem, which is an essential feature in the proper operation and function of the device.

I claim:

1. In a pneumatic for automatic pianos, a valve structure having a perforated wall, a valve stem freely extending through the perforation therein and having its ends threaded, a buffer adjustably mounted on one end of the valve, a rigid flange on the stem intermediate its length, a valve adjustably mounted on the upper end of the stem and seating downwardly on said wall, and an intermediate valve disk rigidly setting against said flange and seating on the opposite side of said wall, said intermediate valve interlocking with the stem at said flange.

2. A valve structure for pneumatic actions of automatic pianos, comprising a stem threaded at its opposite ends, a valve disk adjustable on one end and a buffer adjustable on the other end thereof, a flange rigid on said stem intermediate its ends, an intermediate valve disk on the stem, and means for interlocking said latter disk and the stem.

3. A valve structure for pneumatic actions of automatic pianos, comprising a stem threaded at its opposite ends, a valve disk adjustable on one end and a buffer adjustable on the other end thereof, a flange rigid on said stem intermediate its ends, an intermediate valve disk on the stem, and projections on said stem for interlocking with the latter disk.

In testimony whereof I affix my signature in presence of two witnesses.

JOHN S. MAXWELL.

Witnesses:
ARNOLD E. PFEIFFER,
WALTER G. CRONIN.

Copies of this patent may be obtained for five cents each, by addressing the "Commissioner of Patents, Washington, D. C."